United States Patent [19]
Fisher

[11] 3,821,655
[45] June 28, 1974

[54] HIGH-FREQUENCY AMPLIFIER

[75] Inventor: Alan J. Fisher, Huntsville, Ala.
[73] Assignee: SCP Systems, Inc., Huntsville, Ala.

[22] Filed: Aug. 24, 1970
[21] Appl. No.: 66,392

[52] U.S. Cl. ................. 330/15, 330/118, 330/38 M
[51] Int. Cl. ................................................ H03f 3/26
[58] Field of Search ......... 330/55, 122, 15; 307/237

[56] References Cited

UNITED STATES PATENTS

| | | | |
|---|---|---|---|
| 2,401,717 | 6/1946 | Wolffe et al. | 330/55 X |
| 2,427,241 | 9/1947 | Hofweegen et al. | 330/55 |
| 2,467,778 | 4/1949 | Redmond | 330/55 |
| 2,665,339 | 1/1954 | Leng | 330/55 |
| 2,786,903 | 3/1957 | Price | 330/122 |
| 3,115,582 | 12/1963 | Yoshii et al. | 307/237 |
| 3,309,527 | 3/1967 | Walker | 330/15 X |
| 3,652,947 | 3/1972 | Hollingsworth | 330/15 |
| 3,652,948 | 3/1972 | Fierstein et al. | 330/15 |

*Primary Examiner*—Nathan Kaufman
*Attorney, Agent, or Firm*—Curtis, Morris and Safford

[57] ABSTRACT

A high-frequency amplifier intended for use primarily in radio transmitters, and particularly in transmitters used in aircraft. The circuit preferably is a push-pull circuit utilizing a pair of power transistors. A capacitor is connected between the emitter and collector leads of each transistor. The capacitance of the capacitor has a value such that the capacitor and the output inductance of the transistor together form a resonant circuit whose center frequency coincides with the center frequency of the band of the second harmonic signals produced by the amplifier, thus effectively minimizing second harmonic voltages in the transistors. Preferably, the capacitors are formed by parallel-plate transmission lines which also are used to interconnect the electrodes of the transistors, and to form input and output leads of the circuit. The parallel-plate transmission lines have very low inductances; their use minimizes the lead inductances of the amplifier. An output transformer is provided which performs the function both of an output transformer and a radio-frequency choke.

18 Claims, 14 Drawing Figures

INVENTOR
ALAN J. FISHER
BY
Curtis, Morris & Safford
ATTORNEYS

INVENTOR
ALAN J. FISHER
BY
Curtis, Morris & Safford
ATTORNEYS

INVENTOR
ALAN J. FISHER
BY
Curtis, Morris & Safford
ATTORNEYS

INVENTOR
ALAN J. FISHER
BY
Curtis, Morris & Safford
ATTORNEYS

HIGH-FREQUENCY AMPLIFIER

This invention relates to high-frequency amplifiers and radio transmitters utilizing such amplifiers.

Many different circuits have been tried in prior attempts to provide an efficient, reliable high-frequency solid-state amplifier suitable for use as the power amplifier in aircraft radio transmitters. In particular, push-pull circuits have been tried. However, many such circuits have failed due to their tendency to develop destructive parametric oscillations. Furthermore, in some such prior circuits, excessive second harmonic voltages have limited the efficiency. One result of such limited efficiency is greater tendency of the power transistors in the circuits to overheat and to destroy themselves due to the effects of thermal runaway.

As a result of the foregoing problems, some have abandoned attempts at using a push-pull circuit and have resorted to connecting the power transistors in parallel with one another. The frequent result is that current balance is not maintained between the transistors, and one of the transistors carries more current than the other and burns out.

Another problem with prior amplifiers is that, when amplifying relatively high frequencies, the inductances of the leads used to interconnect the circuit components aggravate the problem of minimizing second harmonic voltages. Some prior circuits, while partially solving this and other of the foregoing problems, do not maintain a satisfactory bandwidth or gain.

Accordingly, one of the main objects of the present invention is to provide a solid-state high-frequency amplifier which operates with a relatively high efficiency, has a relatively large bandwidth and gain, and yet is relatively reliable and free from malfunction. It is a further object to provide a radio transmitter, and particularly an aircraft radio transmitter, having a high-frequency amplifier with the foregoing desirable features.

The foregoing objects are met, in accordance with the present invention, by the provision of a high-frequency amplifier in which a pair of semiconductor elements are connected together in a push-pull circuit configuration. A capacitor is connected across each semiconductor element. The capacitance of the capacitor is set at a value such that, together with the output inductance of the semiconductor element, it will form a resonant circuit which resonates approximately at the frequency of the second harmonic of the signals being amplified by the amplifier. Interconnections between the semiconductor elements preferably are made by parallel-plate transmission lines whose capacitances advantageously are used to form the capacitors described above. The inductance presented by such transmission lines at the frequencies of interest is desirably low. An input circuit is provided which minimizes the incidence of parametric oscillations, and an output transformer is provided which combines the functions of an output transformer and a radio-frequency choke. A transmitter using such an amplifier as its power output stage is provided.

Other objects and advantages of the invention will be described in and become apparent from the following description and drawings. In the drawings.

THE TRANSMITTER

Figure 1:
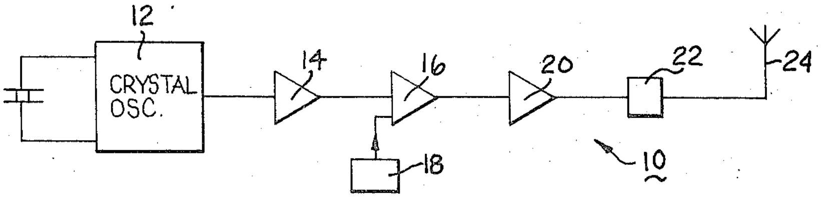
FIG. 1 is a schematic circuit diagram of a radio transmitter utilizing the amplifier of the present invention.

FIG. 1 shows schematically a radio transmitter circuit 10 which is particularly suitable for use as a radio transmitter in aircraft. The transmitter 10 includes a crystal oscillator 12 which provides an output oscillating at a variety of frequencies which are preferably in the "very-high frequency" band, from 30 to 300 megahertz. The output of the oscillator 12 is amplified by a first amplifier 14 and a second amplifier 16. The signal is modulated by a modulating device 18 (e.g., a microphone) which controls the amplification of the amplifier 16. The modulated output from amplifier 16 is further amplified by a power amplifier 20, whose output is transmitted to a transmitting antenna 24 through a harmonic suppression filter 22. The transmitter 10 is conventional except for the construction of the power amplifier 20, and that amplifier will be described in detail below.

SECOND HARMONIC SUPPRESSION IMPEDANCE

Figure 2:
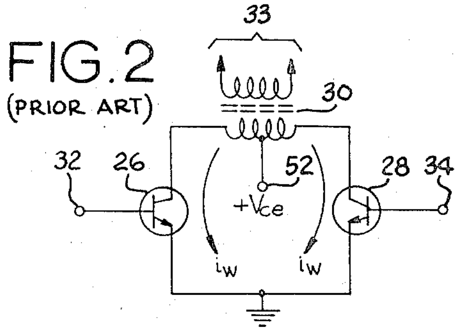
FIG.2 (PRIOR ART)
FIG. 2 is a schematic circuit diagram of a typical prior art push-pull semiconductor amplifier.

A conventional prior art transistor push-pull high-frequency power amplifier is illustrated in FIG. 2. The amplifier shown in FIG. 2 includes a pair of power transistors 26 and 28, a center-tapped output transformer 30, and input leads 32 and 34. The output signal appears across the leads 33 of the secondary winding of the transformer 30. Theoretically, when the amplifier shown in FIG. 2 is operated as a class B or C push-pull amplifier, it should provide good performance. However, because of the problems discussed above, the reliability, efficiency, and/or gain and bandwidth of such an amplifier, when used at very high frequencies, is believed to have been unsatisfactory.

Figure 3:
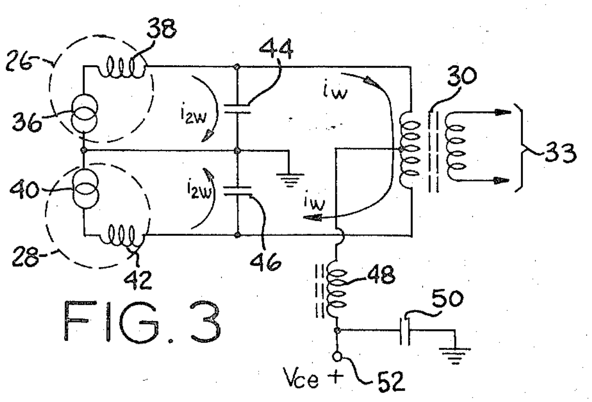
FIG. 3 is a schematic circuit diagram of one embodiment of the amplifier of the present invention.

One embodiment of the amplifier 20 of the present invention is shown schematically in FIG. 3. In FIG. 3, each of the transistors 26 and 28 has been replaced by its equivalent circuit, namely, a signal generator 36 or 40 connected in series with an inductor 38 or 42. A capacitor 44 is connected across the output terminals (between the emitter and collector leads) of transistor 26, and another capacitor 46 is similarly connected across the output leads of transistor 28. A radio-frequency choke 48 couples a DC power supply at 52 to the center tap of the primary winding of transformer 30, and a by-pass capacitor 50 is connected to terminal 52 to by-pass AC signals to ground, in a manner which is well known in the prior art.

In prior push-pull amplifiers using vacuum tubes, capacitors have been used to form a short circuit to second harmonic plate voltages. However, until the present invention, it is believed that attempts at solving the problem by the same approach when the tubes are replaced by transistors have not been entirely successful.

In accordance with the present invention, applicant has recognized that the output inductance 38 or 42 of each transistor can seriously impair the performance of the amplifier unless it is taken into consideration in computing the amount of capacitance necessary to provide a true short circuit for second harmonic suppression. Therefore, the capacitance of each capacitor 44 or 46 is set at a value such that the capacitor forms, together with the output inductance 38 or 42 of the transistor to which it is connected, a resonant circuit whose center frequency coincides approximately with the center frequency of the band over which the frequency of the second harmonic current varies. Thus, any second harmonic currents ($i_{2w}$) generated by the transistors will be short-circuited to ground, whereas the fundamental current ($i_w$) will be delivered to the output transformer 30. The short-circuiting to ground of the second harmonic currents minimizes or eliminates second harmonic voltages across generators 36 or 40 within the transistors and significantly improves the efficiency of the amplifier.

The preferred structure for providing the desired capacitor for the resonant circuit is described below.

TRANSISTOR INTERCONNECTION AND MOUNTING STRUCTURE

FIGS. 4 through 7 illustrate the preferred embodiment of the amplifier 20. In particular, these Figures show the preferred structure for interconnecting and mounting the transistors 26 and 28.

Figures 4, 5:
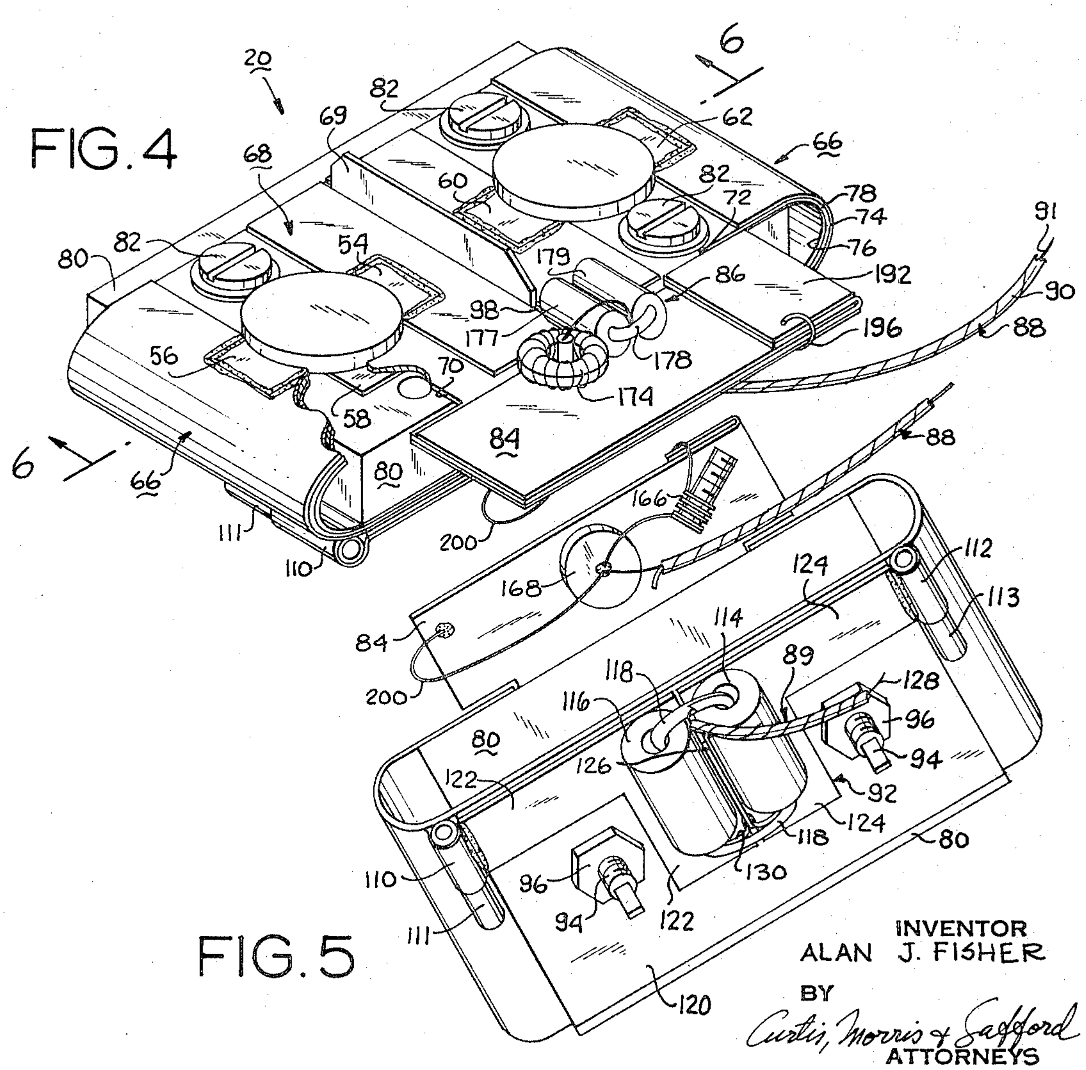
FIG. 4 is a top perspective view of the preferred embodiment of the amplifier of the present invention.
FIG. 5 is a bottom perspective view of the amplifier shown in FIG. 4.
Figure 7:
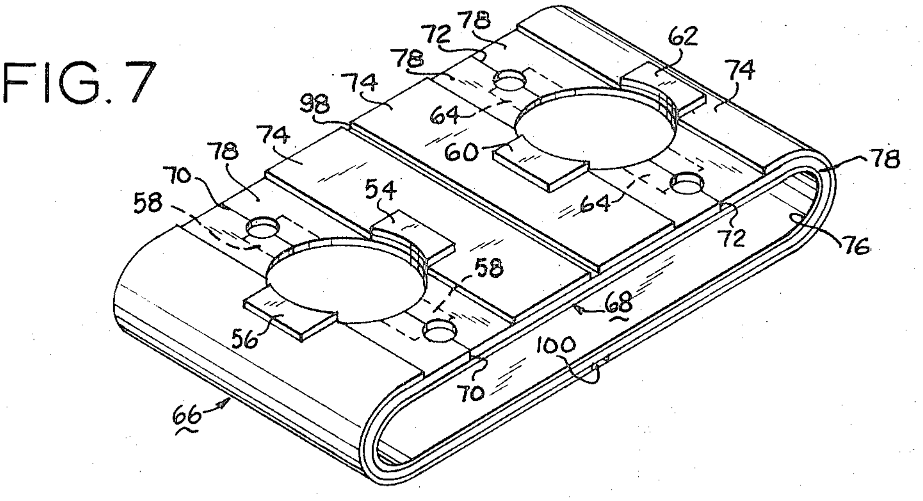
FIG. 7 is a perspective, partially schematic view of a portion of the amplifier shown in FIGS. 4 through 6.

Transistor 26 is a power transistor which has a base lead 54, a collector lead 56, and two emitter leads 58 (only one emitter lead is shown in FIG. 4, but both are indicated in FIG. 7). Transistor 28 similarly has a base lead 60, a collector lead 62 and two emitter leads 64. The leads to transistors 26 and 28 are in the form of thin flat metallic tabs or sheets. The emitter leads 58 and 64 of transistor 26 and 28 are connected together and grounded, and the capacitors 44 and 46 are provided by a parallel-plate transmission line indicated generally at 66. The transmission line 66 consists of a sheet 78 of insulating material with thin metal coatings 74 and 76 on opposite sides of the insulation. The material of the sheet 78 is a dielectric material composed of teflon with fiberglass fibers imbedded in it; this is a material commonly used as a base for high-frequency printed circuits. The sheet 78 preferably is about 0.01 inch thick, and the metallic coatings preferably are relatively thinner, e.g. around 2.5 mils thick. The coatings can be formed by conventional printed circuit fabrication techniques.

Referring to FIG. 7 as well as FIG. 4, the metal coating 74 on the outside of the transmission line 66 ends a certain distance away from each edge 70 or 72 of the transmission line. A second short transmission line, indicated generally at 68, also is provided. It also has a central dielectric sheet coated in certain areas with metal. The edges of the transmission line 68 extend up to and abutt against the edges 70 and 72 of the other transmission line 66. Outside portions near the ends of transmission line 68 also have no metal coating so that the abutting ends of the two transmission lines form a metal-free mounting region for the transistors 26 and 28, and for four mounting screws 82. Holes are formed in each such mounting region to accomodate the housings of the transistors 26 and 28, and the screws 82.

FIG. 7 is a partially schematic view of the transmission lines 66 and 68, with the transistors 26 and 28 removed but with the electrode tabs of the transistor shown in the positions they have in the final assembly. Referring again to FIG. 4 as well as FIG. 7, the base lead 54 of transistor 26 is connected to a first metalized region 74 on the exterior (upper surface) of transmission line 68, and the base lead 60 of transistor 28 is attached to a separate metalized area on the upper surface of the same transmission line. The two metalized areas just referred to are separated by a narrow gap 98 (see FIG. 7) and input currents are fed into the two base leads through the two metalized areas, which are connected to an input transformer 86 and other circuitry mounted on an extension or "shelf" 84 of the insulation portion of the transmission line 68 (the extension 84 is not shown in FIG. 7). A planar capacitor 69 (see FIG. 4) is connected between the two metalized areas to the other ends of which the base leads are connected. The capacitor 69 also is a thin sheet of dielectric material with metal on both sides. The purpose of this capacitor will be discussed below.

The collector lead 56 of transistor 26 is connected to an outside metalized area of the transmission line 66, and the collector lead 62 of transistor 28 is connected to a separate outside metalized portion of the same transmission line. The transmission line 66 is bent near each collector connection so as to be folded under the transistors. The two metalized portions to which the collectors are connected are separated by a narrow gap 100 (see FIG. 7) at which an output transformer 92 (see FIG. 5) is attached.

The emitter leads 58 and 62 are held between the innermost metallic surfaces of both transmission lines 66 and 68 and a central conductive block 80 by means of the four screws 82 and associated washers. This, in effect, causes the emitters and internal metallic surfaces of both transmission lines to become electrically continuous, even though they are mechanically separate to facilitate assembly.

The structure just described has several functions and advantages. One such function is to interconnect the transistor leads with the addition of as little inductance as is possible. As is well known, wide and thin parallel-plate transmission lines have very little inductance. Therefore, a short electrical length of such transmission line can provide the proper amount of capacitance for the capacitors 44 and 46 without introducing appreciable additional circuit inductance. If conventional interconnections were used, the added inductance would severely limit the band of frequencies over which an effective second harmonic short circuit could be effected.

Therefore, one function of the parallel-plate transmission line 66 is to form the capacitors 44 and 46. The capacitor 44 comprises the inner metallic layer 76, the portion of the outer layer 74 which is connected to the collector 56 of transistor 26, and the dielectric material 78 in between. The capcitor 46 comprises the inner layer 76, the portion of the outer layer 74 which is connected to the collector 62 of transistor 28, and the dielectric material 78 between those metallic surfaces.

Figure 8:
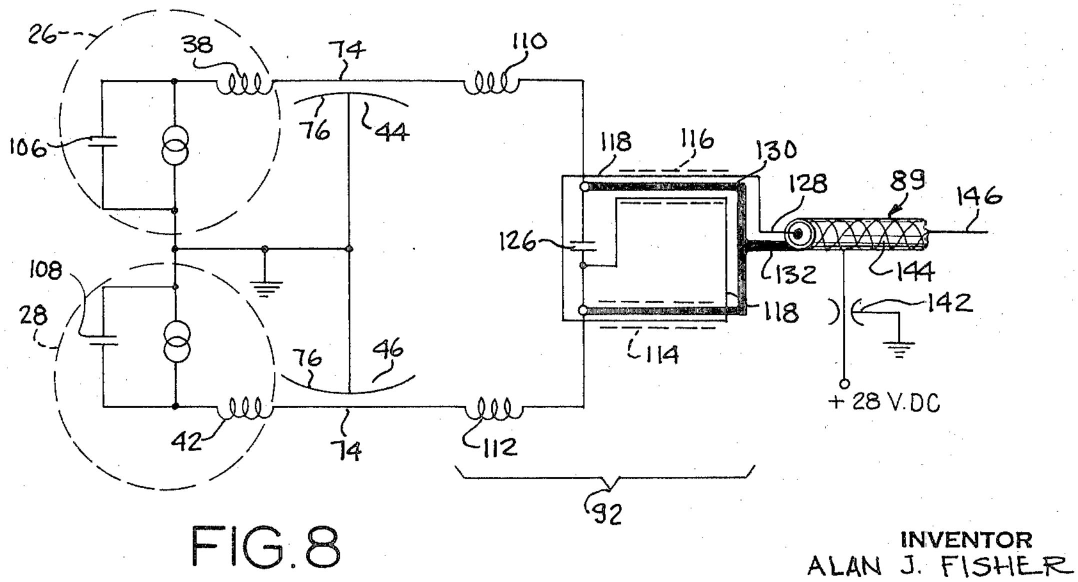
FIG. 8 is a schematic circuit diagram of the equivalent output circuit of the amplifier shown in FIGS. 4 through 7.

FIG. 8 is an equivalent schematic circuit diagram of the amplifier 20, without the input circuit. FIG. 8 shows the manner in which the capacitors 44 and 46 are formed and connected to the transistors 26 and 28. It can be seen that the capacitor connections are the same in FIG. 8 as in FIG. 3.

The folding of the transmission line 66 is advantageous in that it extends the collector leads of the two transistors so that they are separated only by the narrow gap 100 (FIG. 7) in the outer conductor of the line 66. Similarly, the extended base leads are separated only by the narrow gap 98. This construction has the advantage that no appreciable inductance is introduced into either the input of output terminal extensions. With the low impedances involved, the added inductances of conventional circuit connections would reduce the operating bandwidth. This construction also causes the input and output currents of the transistors to be completely separated while outside the transistor packages. This eliminates any external impedance common to input and output currents that would adversely affect the amplifier power gain.

Another advantage of the use of flat transmission lines to interconnect the transistor electrodes is that the transmission lines have the same flat configuration as the electrode leads. This facilitates soldering or otherwise attaching the leads to the lines.

Figure 6:
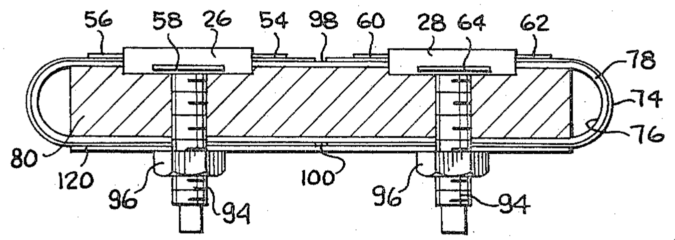
FIG. 6 is a cross-sectional, partially schematic view taken along lines 6—6 of FIG. 4.

As it is shown in FIGS. 4 through 6, and particularly in FIG. 6, the transistors 26 and 28 are mounted in a solid metallic block 80 preferably made of copper or a similarly good conductor. The housings of the transistors are mounted in recesses in the upper surface of the block. Each transistor has an integral threaded mounting stud 94 which passes through a hole in the block 80. A nut 96 is threaded onto the lower end of each stud 94 and abutts against a panel 120 of insulation material, the purpose of which will be described below. As it can be seen most clearly in FIG. 4, the rear edge of the metallic block 80 extends outwardly from the confines of the loop formed by the transmission line 66. Advantageously, the rear edge of the block is placed in constant with a good heat conducting surface when it is mounted in the transmitter structure. Thus, the block 80 serves as a heat conductor which carries heat away from the transistors 26 and 28, and as a ground for the circuit.

The capacitances desired for the capacitors 44 and 46 in order to form resonant circuits for second harmonic suppression are determined as follows: First, the output inductance, i.e., the inductance between the emitter and collector leads of each transistor, must be determined. It is believed that the following method of determining the output inductance is novel and advantageous. First, a flat plate having the same layered construction as the transmission line 66 is provided. A hole is cut in the plate, and the transistor housing is fitted into the hole. The collector tab is connected to one metallic surface of the plate, and the emitter tabs are connected to the opposite metallic surface. A D.C. bias current is applied between the base and collector lead through an R-F choke. Another D.C. bias current is applied between the base and emitter leads of the transistor, through another R-F choke, to bias both transistor junctions into a fully conductive state. With this arrangement, a very low inductance capacitor, in the form of the parallel-plate structure, is connected between the emitter and collector leads of the transistor, and the transistor is in a fully conductive state. Then, a conventional grid-dip meter is used to measure the resonant frequency of the combination of the output inductance of the transistor and the capacitance of the plate to which the transistor is connected. The high R.F. impedances of the R-F chokes prevent the bias leads from affecting the measurement made by the grid-dip meter. Since the capacitance of the transmission line may be separately measured, the output inductance can then be computed from the measured resonant frequency. Then, the value of capacitance necessary to create resonance at the second harmonic center frequency easily can be computed. Both computations can be made in accordance with the following equation: $f_o = (1/2\pi\sqrt{lc})$, where $f_o$ is the resonant frequency, and L and C are the inductance and capacitance, respectively, of the resonant circuit.

Each transmission line interconnecting the electrodes of the transistors should have an electrical length which is a small fraction of the wavelength of the second harmonic currents. This allows the lines to function essentially as low inductance capacitors to the second harmonic currents.

OUTPUT TRANSFORMER CONSTRUCTION

FIGS. 5 and 9 through 12 show the structure of the output transformer 92 of the amplifier 20, and the circuit diagram for the output transformer is shown in FIG. 8.

Figure 10:
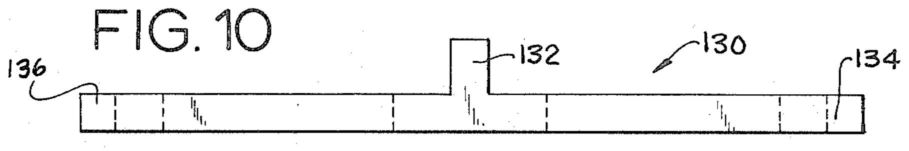
FIG. 10 is an elevation view of a component of the transformer shown in FIG. 9.
Figure 11:
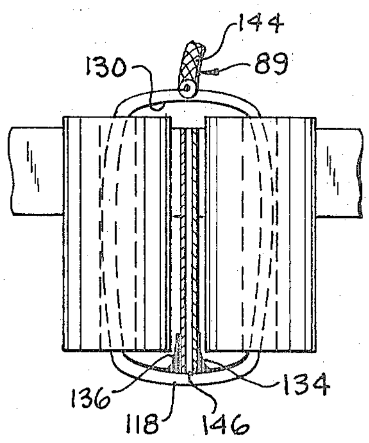
FIG. 11 is a plan view of the transformer shown in FIG. 9.
Figure 12:
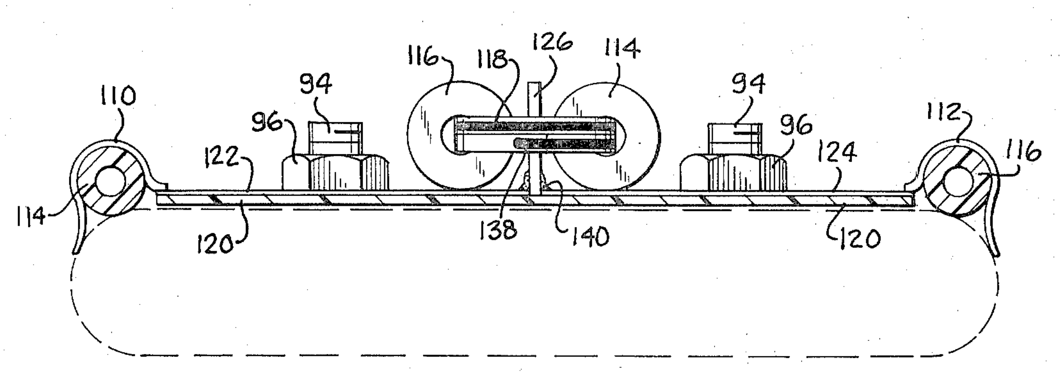
FIG. 12 is an elevation view, partly in section, showing the transformer of FIGS. 9 through 11 assembled and positioned upon the amplifier device.

Referring first to FIGS. 5 and 12, the output transformer 92 includes a pair of cylindrical ferrite sleeves 114 and 116. The primary winding for the transformer is a single turn formed by a copper strap 130, which is shown in FIG. 10 prior to being bent to form a turn. The strap 130 has two end portions 134 and 136, and a centrally located vertical projection or tab 132. The strap 132 is fitted through the central openings in the two sleeves 114 and 116, and the ends 134 and 136 of the strap 130 are soldered to the opposite surfaces of a flat capacitor 126. The capacitor 126 has the same layered construction as the transmission line 66 and 68; i.e., the capacitor 126 has two parallel metallic surfaces separted by dielectric material. Thus, the capacitor 126 is connected between the ends of the primary winding 130.

The secondary winding of the output transformer 92 comprises a second metallic strap 118 which winds for one and one-half turns through the openings in the two sleeves 114 and 116. The secondary winding is separated from the primary winding by dielectric insulating material 146 (see FIG. 11) so that together the primary and secondary windings form another parallel-plate transmission line with minimal inductance.

Figure 9:
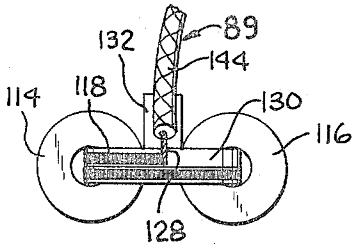
FIG. 9 is an elevation view of the output transformer of the amplifier shown in FIGS. 4 through 8.

A 50-ohm coaxial output cable 89 (see FIGS. 5, 8, 9 and 11) is provided. The cable 89 has a central conductor 128 and external metallic braid shielding 144. The central conductor 128 is connected to one end of the secondary winding, as shown in FIGS. 9 and 5. The shielding 144 is soldered to the upstanding tab 132 of the primary winding 130.

The capacitor 126 is connected between the extended collector leads of the two transistors 26 and 28, in the manner shown in FIG. 12. The output transformer 92 is mounted on two generally L-shaped metalized areas 122 and 124 (see FIG. 5) on the surface of a sheet of insulation material 120. One metal surface of the capacitor 126 is soldered at 140 (see FIG. 12) to the metal area 124, and the other metal surface of the capacitor 126 is similarly soldered to the metal area 122. Each metal area 122 and 124 has a relatively narrow, elongated portion near the edge of the amplifier structure. Attached to the end of the narrow portion of area 122 is a curved strip 110 (see FIGS. 5 and 12) of metal which forms approximately half of a cylinder around a fiberglass insulation tube 114. A similar metal strip 112 is connected to the end of the narrow portion of metallic region 124 and forms a half-cylinder around a second fiberglass tube 116. The opposite end of each loop 110 and 112 is attached to the collector of one of the transistors through the external metallic surface of the transmission line 66. Each strip 110 and 112 has an inductance which is connected in the output circuit in the manner shown in FIG. 8. The strips 110 and 112, together with the capacitor 126, are used for impedance matching purposes.

As is shown in FIG. 8, a positive 28 volt DC power source is connected to the center of the primary winding of the output transformer by the simple expedient of connecting the source to the braided metallic shield of the coaxial output line 89. A feed-through type bypass capacitor 142 is provided to conduct high-frequency signals to ground instead of to the 28 volt DC source.

Referring again to FIG. 8, the output circuit serves several different functions. First, the output transformer serves the usual function of the center-tapped output transformer in any push-pull amplifier. Secondly, the transformer, together with the inductors 110 and 112 and the capacitor 126, comprises an impedance matching device. The coaxial output cable 89 conventionally has an impedance of 50 ohms. It is desired to transform the impedance of the coaxial cable to the impedance preferred for use with the transistors 26 and 28 for best operating efficiency. In a typical device which has been built and tested, the preferred output impedance presented to the transistors is 10.6 ohms. Therefore, the problem is to provide a relatively low equivalent primary impedance of 10.6 ohms, and a relatively high equivalent impedance of 50 ohms at the output of the transformer.

The secondary impedance of 50 ohms is determined by the construction of the secondary and primary winding straps. The width of the secondary strap 118 and the thickness of the dielectric material 146 (see FIG. 11) separating the primary and secondary straps are selected so that together they form a 50-ohm parallel-plate transmission line in which the primary strap 130 serves as a ground plane. Since the parallel-plate transmission line has negligible inductance, there is very little inductance to narrow the transformer bandwidth and thus narrow the bandwidth of the amplifier 20.

Although it would appear that the turns ratio of the output transformer is one and one-half to one, actually it is two to one since, in effect, one-half turn of the primary strap also becomes one-half turn of the secondary winding. Therefore, the secondary winding impedance of 50 ohms, when reflected back to the primary of the output transformer, becomes 12.5 ohms. The value of the inductors 110 and 112 and the capacitor 126 are selected so that the combination of those reactances with the 12.5 ohms of the primary winding presents an overall impedance of 10.6 ohms to the transistors 26 and 28.

The output transformer 92 serves another purpose. Each of the ferrite sleeves 114 and 116 is wrapped around one-half of the primary winding of the output transformer, and acts as a radio-frequency choke which greatly surpresses the flow of common mode (push-push) second and higher harmonic currents through the transformer. Thus, a separate choke such as a choke 48 shown in FIG. 3 is not needed. Of course, the impedance of this transformer to push-pull currents at the fundamental frequency and D.C. is relatively low.

INPUT CIRCUIT

As is shown in FIGS. 4, 5, 13 and 14, the input signal to the amplifier 20 is conducted through a coaxial cable 88. Typically, this cable has an impedance of 50 ohms. In order to prevent reflections in the cable 88, it is desired to match the input impedance of the amplifier to the impedance of the coaxial cable. Additionally, it is desired to provide some means for inhibiting parametric and ordinary oscillations. An input circuit performing these functions is provided in the present invention.

Figure 14:
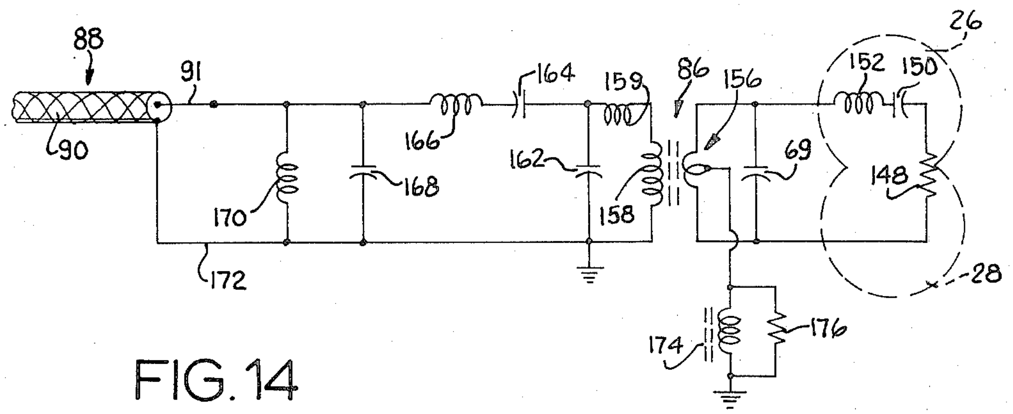
FIG. 14 is a schematic circuit diagram showing the equivalent input circuit of the amplifier shown in FIGS. 4 through 8.

FIG. 14 is a schematic diagram of the equivalent input circuit of the amplifier 20. The transistors 26 and 28 have been replaced by their equivalent input impedance, which is measured experimentally. This impedance, for typical high-frequency power transistors (e.g., Fairchild MSA 8503 transistors) was determined to be a resistance 148 of 1.5 ohms in series with an inductance 152 of 4.82 nanohenries and a capacitance 150 of 784 picofarads at 133 megahertz, the mean frequency of the preferred band from 116 to 152 megahertz.

It is desirable to use a four pole (four resonator) filter in the input impedance-matching circuit in order to obtain best response from 116 to 152 megahertz. In order to enable the use of circuit components of a practical size and cost, the present invention utilizes an input transformer 86 whose secondary winding 156 is connected between the extended base leads of the transistors 26 and 28 in order to provide, by means of the transformer, an increase of the input impedance of the transistors. Accordingly, the transformer 86 is two-to-one step-down transformer which provides a four-to-one multiplication of the input impedance of the transistors. The first pole of the four pole bandpass filter consists of reactances 150 and 152 internal to the transistors. The remaining poles (resonators) serve the purpose of cancelling these internal reactances over the operating band of frequencies.

The second pole of the filter consists of reactances 69, 86 and 162. The third pole consists of reactances 164 and 166 and the fourth pole consists of reactances 168 and 170. Usual filter design methods were somewhat modified to compensate for the fact that the resonant frequency of reactances 150 and 152 is not at midband.

Reactance 162 is a capacitor which is connected across the primary winding 158. A series-connected inductor 166 and capacitor 164 combination is connected to one terminal of the capacitor 162. The reactance 168 is a capacitor which is connected in parallel with an inductor 170, the combination of which is connected between the central conductor 91 and the external shield braid 90 of the coaxial cable 88. The later connection is made by way of a conductor 172.

The transformer 86 has a leakage inductance corresponding to 4.33 ohms, and has negligible shunt reactance.

An R-F choke 174 is connected from a center tap of the secondary winding 156 of transformer 86 to ground in order to provide a return path for DC base current for the transistors. A resistor 176 is connected in parallel with the choke 174 in order to keep the "Q" value for the DC return path low and thus eliminate parametric and ordinary oscillations. The parameters of the choke and resistor necessary to eliminate such oscillations are determined by trial and error.

The capacitor 69 (also see FIGS. 4 and 13) is connected between the extended base leads of the transistors 26 and 28 and across the secondary winding 156 of the transformer 86 in order to cancel some of the inductance of the transformer and the transistors. Since it is important to minimize the inductance of the capacitor 69, the capacitor preferably has the form of another parallel-plate transmission line of the type described above. Specifically, a capacitor element measuring 0.8 inches by 0.18 inches by 0.01 inch thick with a dielectric material having a dielectric constant of 87 has been provided and found to be satisfactory. As is shown in FIG. 13, the metal surfaces of the capacitor 69 are soldered to the metallic portions 74 of the short transmission line 68, thus connecting the capacitor to the base leads of the transistors 26 and 28.

Figure 13:
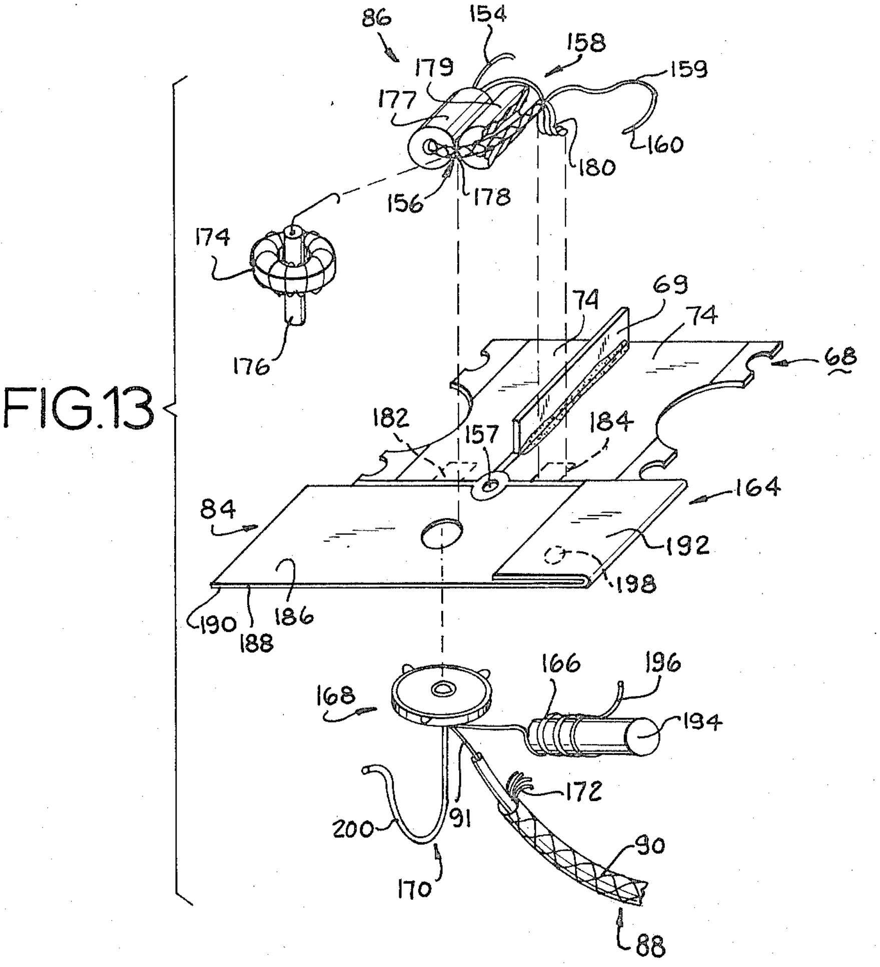
FIG. 13 is an exploded perspective view of the input transformer of the amplifier shown in FIGS. 4 through 8.

FIG. 13 is an exploded view of the input transformer and the impedance matching circuit construction used in the preferred embodiment of the amplifier of the present invention. The transformer 86 includes a pair of ferrite sleeves 177 and 179 which are mounted side-by-side. A short length 178 of conductive braid such as that used on coaxial cable is threaded through the central apertures of the sleeves 177 and 179 so as to form a U-shaped conductor with two ends 180 (only one of which is shown in FIG. 13) extending from the rear openings of the sleeves. The braid 178 is used as the secondary winding 156 of the transformer 86.

Threaded through the center opening of the braid 178 are two turns of Teflon-coated No. 28 magnet wire, which form the primary winding 158 of the transformer 86.

Referring now to the central portion of FIG. 13, the shelf 84 upon which the transformer and other input circuitry components are mounted actually uses the same insulating sheet as the input transmission line 68. The shelf 84 includes an upper metallic surface 186, a lower metallic surface 190 which serves as a ground plane, and a central insulating member 188 separating the upper and lower conductive surfaces.

The ends 180 of the secondary winding 156 are connected at 182 and 184 to the base leads of the two transistors by the following means:

The ends 180 are "combed out" (unraveled) so that the braid is flat, and the ends 180 are soldered to the areas 182 and 184 of the transmission line 68. One end 154 of the primary winding of the transformer extends through a hole 157 in the insulation of the shelf 84 and is soldered to the ground plane 190 on the undersurface of the shelf. The other end of the primary winding first forms a half-loop 159 which has a "wicket" shape, and then terminates in an end portion 160 which is soldered to the upper surface 186 on the shelf 84. The wicket 169 is an inductor which is used to modify the transformer inductance to a desired value.

The choke 174 consists of a toroidal ferrite core with a winding. The ends of the winding are connected to the terminals of a resistor 176 whose body passes through the central aperture of the core of choke 174. The upper terminal of this combination is connected to the braid 178 (also see FIG. 4), and the lower terminal of this combination also passes through the hole 157 and is soldered to the ground plane 190 on the undersurface of the shelf 84. Thus, the circuit is connected between the center of the secondary winding of the transformer and ground.

The capacitance 168 preferably is a "button" type of capacitor as is shown in FIG. 13. Its case is soldered to the ground plane 190 so as to connect one of the terminals of the capacitor to ground. The coil 166 is wound upon an insulator 194 and has one terminal connected to the ungrounded terminal of the capacitor 168. The other terminal 196 of coil 166 passes around the edge of the shelf and is soldered to the upper surface of a folded-over portion 192 of the shelf 184. The latter connection is made at a point indicated at 198 in FIG. 13. FIG. 4 shows how this connection is made.

The capacitance between the ground plane 190 and the upper surface 186 of the shelf 84 actually comprises the capacitor 162. The capacitor 164 is formed by the folded-over portion 192 of the shelf, and the inductor 166 is connected in series with the capacitor 164, as is shown in FIG. 14 as well as FIG. 13. A "hairpin" shaped coil 200 is connected between the common point of the input cable conductor 91 and the ground plane 190 (also see FIG. 5). The loop 200 is the inductor 170 in the circuit shown in FIG. 14. The braid 90 is terminated at 172 and the portion 172 of the braid is soldered to the ground plane 190, as is shown in FIG. 5.

The amplifier 20 described above and illustrated in FIGS. 4 through 14 actually has been built and successfully tested. The actual values and identification of the components used in the amplifier which was successfully tested are listed below:

| COMPONENT | VALUE OR IDENTIFICATION |
|---|---|
| Transistors 26 and 28 | MSA 8503 Silicon NPN power transistors manufactured by Fairchild Semiconductor Corporation |
| Inductances 38 and 42 (measured) | 3.94 nanohenries each |
| Capacitances 106 and 108 (measured) | 41 picofarads each |

-Continued

| COMPONENT | VALUE OR IDENTIFICATION |
|---|---|
| Capacitors 44 and 46 | 90 picofarads (effective) each |
| Inductors 110 and 112 | 0.25" wide on a 0.162" O.D. Form |
| Capacitor 126 | 6.8 picofarads |
| Capacitor 142 | 0.27 microfarads |
| Resistance 148 | 1.50 ohms |
| Capacitor 150 | 784 picofarads |
| Inductor 152 | 4.82 nanohenries |
| Capacitor 69 | 277 picofarads |
| Capacitor 162 | 29.2 picofarads |
| Capacitor 164 | 7.6 picofarads |
| Inductor 166 | 185 nanohenries |
| Capacitor 168 | 82 picofarads |
| Inductor 170 | 19 nonohenries |
| Inductor 174 | 3.0 microhenries |
| Inductor 159 | 1.0 nanohenry |
| Resistor 176 | 18 ohms, 1/10 watt |

The amplifier having the above components was tested and found to produce 100 watts C. W., or 30 watts A.M. carrier, over a band from 116 to 152 megahertz. The amplifier had 70 percent efficiency over this frequency band, while produding 30 watts output from a 14 volt D.C. supply. Drive power required was 2.3 watts at 116 megahertz, and 3.9 watts at 152 megahertz in order to produce the latter output. The efficiency of the amplifier, under optimum conditions, approached 80 percent.

It is believed that the amplifier of the present invention provides a combination of high efficiency, high gain and wide bandwidth, together with high reliability, that has not been attained in any prior solid-state high-frequency amplifier. The higher efficiency allows the transistors to operate cooler than comparable prior amplifiers. This greatly reduces the likelihood of transistor burnout due to thermal runaway. Furthermore, the tendency of the circuit towards parametric oscillation is eliminated. The transmitter using this amplifier thus is more reliable and has better performance than prior transmitters.

The above description of the invention is intended to be illustrative and not limiting. Various changes or modifications in the embodiments described may occur to those skilled in the art and these can be made without departing from the spirit or scope of the invention.

I claim:

1. A high-frequency amplifier comprising, in combination, a pair of semiconductor elements connected together in a push-pull amplifier circuit configuration, and a pair of capacitors, each connected to one of said semiconductor elements and having a capacitance value at which the capacitor and the output inductance of the semiconductor element to which it is connected together form a resonant circuit which resonates approximately at the frequency of the second harmonic of the signal amplified by said amplifier.

2. An amplifier as in claim 1 in which said resonant circuit is tuned to resonate at approximately the center frequency of the frequency band for said second harmonic, and means for supplying oscillating energy of a frequency from 30 to 300 megahertz to said amplifier.

3. An amplifier as in claim 1 in which said semiconductor elements are transistors, each of which has base, emitter and collector electrodes, and each capacitor is connected between the emitter and collector leads of one of said transistors.

4. An amplifier as in claim 1 including a parallel-plate transmission line forming the connections of said push-pull circuit, the plates of said transmission line also forming said capacitors.

5. A high-frequency amplifier comprising, in combination, a pair of semiconductor elements connected together in a push-pull circuit configuration by means of a low-impedance transmission line, said transmission line having two sections each of which forms a capacitor connected across one of said semiconductor elements, each capacitor having a capacitance value at which the capacitor and the output inductance of the semiconductor element to which it is connected together form a resonant circuit which resonates approximately at the frequency of the second harmonic of the signal amplified by said amplifier.

6. In a high-frequency amplifier having a plurality of semiconductor devices, each having control electrodes, at least one parallel-plate transmission line connected to a control electrode of each of a pair of said devices and having a gap in one of its plates, the portions of the plate adjacent the edges of said gap comprising connection terminals.

7. An amplifier as in claim 6 including another parallel-plate transmission line forming a loop extending between two other electrodes of said devices, said other line also having a gap in one of its plates to form connection terminals.

8. An amplifier as in claim 7 in which said semiconductor devices consist of two transistors, each having base, emitter and collector electrodes, in which said transmission lines connect the emitter electrodes of said transistors to one another, one of said gaps forming output terminals, and the other of said gaps forming input terminals in said amplifier.

9. An amplifier as in claim 7 in which said semiconductor devices consist of a pair of transistors, each having base, emitter and collector electrodes, one plate of one of said lines connecting the emitter electrodes of said transistors together, the gap in the other plate of said one line forming terminals for the collector electrodes of said transistors, the gap in the plate of the other line forming terminals for the base electrodes of said transistors.

10. A high-frequency amplifier comprising, in combination, a pair of semiconductor elements each having base, emitter and collector electrodes and being connected together in a push-pull circuit configuration by means of a low-impedance transmission line, said transmission line having two sections each of which forms a capacitor connected across one of said semiconductor elements, each capacitor having a capacitance value at which the capacitor and the output inductance of the semiconductor element to which it is connected together form a resonant circuit which resonates approximately at the frequency of the second harmonic of the signal amplified by said amplifier, an output transformer comprising a pair of magnetically permeable sleeves, a primary winding and a secondary winding, said windings being aligned with one another side-by-side and wound through said sleeves, said primary winding being connected in series with the emitter-collector paths of said semiconductor elements.

11. An amplifier as in claim 10 including a center-tap for said primary winding, and means for conducting bias current to said center-tap, said transformer comprising a radio-frequency choke as well as a transformer.

12. An amplifier as in claim 10 in which said primary and secondary windings comprise opposite conductive surfaces of a parallel-plate transmission line.

13. An amplifier as in claim 12 in which the conductive surface forming one of said windings is divided into two parts of approximately equal length, with one of said sleeves extending around each of said parts, and a center-tap terminal at the midpoint between said parts.

14. A high-frequency amplifier comprising, in combination, a pair of semiconductor elements, each having base, emitter and collector electrodes and being connected together in a push-pull circuit configuration by means of a low-impedance transmission line, said transmission line having two sections each of which forms a capacitor connected across one of said semiconductor elements, each capacitor having a capacitance value at which the capacitor and the output inductance of the semiconductor element to which it is connected together form a resonant circuit which resonates approximately at the frequency of the second harmonic of the signal amplified by said amplifier, an input transformer comprising a pair of magnetically permeable sleeves, a primary winding and a secondary winding, said windings being aligned with one another side-by-side and wound through said sleeves, one of said windings being connected between the base electrodes of said semiconductor elements.

15. An amplifier as in claim 14 including a center-tap for said one winding, an R-F choke connected to said center-tap and providing a return path for direct bias current to said base electrodes, and impedance means connected across said choke.

16. An amplifier as in claim 14 in which said windings are aligned coaxially, with one of said windings comprising a conductive sleeve around the other winding, with insulation between said windings.

17. A high-frequency amplifier comprising, in combination, a pair of semiconductor elements, each having base, emitter and collector electrodes and being connected together in a push-pull circuit configuration by means of a low-impedance transmission line, said transmission line having two sections each of which forms a capacitor connected across one of said semiconductor elements, each capacitor having a capacitance value at which the capacitor and the output inductance of the semiconductor element to which it is connected together form a resonant circuit which resonates approximately at the frequency of the second harmonic of the signal amplified by said amplifier, an input transformer comprising a pair of magnetically permeable sleeves, a primary winding and a secondary winding, said windings being aligned with one another side-by-side and wound through said sleeves, one of said windings being connected between the base electrodes of said semiconductor elements, an output transformer comprising a pair of magnetically permeable sleeves, a primary winding and a secondary winding, said windings being aligned with one another side-by-side and wound through said sleeves, said primary winding being connected in series with the emitter-collector paths of said semiconductor elements.

18. An amplifier as in claim 17 in which transmission line is a parallel-plate transmission line which is bent into a loop to form closely adjacent output terminals for the interconnected semiconductor elements.

* * * * *